US011809960B2

(12) United States Patent
Ramasamy (10) Patent No.: US 11,809,960 B2
(45) Date of Patent: Nov. 7, 2023

(54) SYSTEMS FOR REAL-TIME EVENT MANIPULATION PREVENTION THROUGH ARTIFICIAL INTELLIGENCE-ASSISTED QUANTUM COMPUTING

(71) Applicant: BANK OF AMERICA CORPORATION, Charlotte, NC (US)

(72) Inventor: Suki Ramasamy, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 361 days.

(21) Appl. No.: 16/897,352

(22) Filed: Jun. 10, 2020

(65) Prior Publication Data
US 2021/0390439 A1 Dec. 16, 2021

(51) Int. Cl.
*G06N 10/00* (2022.01)
*G06Q 40/04* (2012.01)
*G06N 5/04* (2023.01)
*G06N 20/00* (2019.01)

(52) U.S. Cl.
CPC ............ *G06N 10/00* (2019.01); *G06N 5/04* (2013.01); *G06N 20/00* (2019.01); *G06Q 40/04* (2013.01)

(58) Field of Classification Search
CPC .......... G06N 10/00; G06N 5/04; G06N 20/00; G06N 10/80; G06Q 40/04
USPC .......................................................... 706/12
See application file for complete search history.

(56) References Cited

U.S. PATENT DOCUMENTS

| 10,290,053 | B2 | 5/2019 | Priess et al. |
| 2012/0109821 | A1 | 5/2012 | Barbour et al. |
| 2015/0026027 | A1* | 1/2015 | Priess .................... G06Q 10/04 705/35 |
| 2021/0374584 | A1* | 12/2021 | Coady ..................... G06F 8/311 |
| 2022/0116208 | A1* | 4/2022 | Stapleton ............. H04L 9/0869 |

* cited by examiner

*Primary Examiner* — Irete F Ehichioya
*Assistant Examiner* — Shirley D Hicks
(74) *Attorney, Agent, or Firm* — Moore & Van Allen PLLC; James C. Edwards (57) ABSTRACT

Real-time prevention of computerized event manipulation through the use of Artificial Intelligence (AI)-assisted quantum computing. Determine, at an event request time, if the event is being manipulated and/or is part of a manipulation scheme and, if so, prevent the event from being initiated. A classical computing platform analyzes a batch of historical events using AI including machine learning classification algorithms to result in a manipulation indicator for each of the historical events. A quantum computing platform converts each of the historical events in the batch to a qubit sequence based on attributes associated with the events. The qubits are entangled with qubits of a primary qubit sequence and maintained an entangled list. When an event is requested, attributes associated with the pending event are communicated to the quantum computing platform, which transforms/converts the pending event to the primary qubit sequence based on the attributes associated with the pending event.

12 Claims, 5 Drawing Sheets

SYSTEMS FOR REAL-TIME EVENT MANIPULATION PREVENTION THROUGH ARTIFICIAL INTELLIGENCE-ASSISTED QUANTUM COMPUTING

FIELD OF THE INVENTION

The present invention relates to computerized event processing security and, more specifically, real-time prevention of event manipulation through Artificial Intelligence (AI)-assisted quantum computing.

BACKGROUND

Computer network-related events are processed at a continually increasing rate. Due to the sheer volume of such events and the need to authorize processing of such events within a relatively short period of time, it has heretofore been difficult, if not inconceivable, to determine, during processing authorization, whether an event is or likely is a manipulative event or is otherwise associated with one or more other manipulative events. Currently, events are authorized based on verifying resource availability and authentication of entities associated with the event. Subsequently, after the event has been authorized and processing ensues and, in some instances, after processing is completed, rule-based verifications are performed on events to determine whether an event is suspected to be a manipulative event or is otherwise associated with one or more other manipulative events. If the verifications result in the event being deemed to be a manipulative event suspect, further actions are taken to definitively determine whether or not the event is manipulative or associated with other manipulative events. If the event is ultimately determined to be manipulative or associated with other manipulative events, actions need to be taken to prevent further processing and, in some instances, reverse processing of a completed events.

Therefore, a need exists to be able to determine, in real-time to requesting authorization to perform an event, whether an event is or is likely to be a manipulative event or is otherwise associated with one or more other manipulative events, such that, the event should be forbidden from occurring (i.e., authorization to process the event should be denied).

SUMMARY OF THE INVENTION

The following presents a simplified summary of one or more embodiments in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, apparatus, computer program products, methods and the like for real-time prevention of event manipulation through the use of Artificial Intelligence (AI)-assisted quantum computing. As a result of the real-time processing, the present invention is able to determine, at the time when an event is requested, if the event is being manipulated (or likely is being manipulated) and/or is part of a manipulation scheme/pattern and, if so, prevent the event from being initiated. Thus, the present invention is especially advantageous in applications where an extremely large volume of events are being processed on an ongoing basis.

Specifically, the present invention provides for a classical computing platform to analyze, on a regular basis, a sizeable volume (i.e., a batch) of historical events (e.g., events occurring over the past two years) using AI including one or more Machine Learning (ML) classification algorithms and historical data including denylists, which show relationships to previous manipulative events. The analysis results in a manipulation indicator, otherwise referred to as a manipulation score, for each of the historical events, which indicates a likelihood that the previous event was manipulative or otherwise associated with manipulative events.

In addition, the present invention provides for a quantum computing platform to transform/convert each of the historical events in the batch to a qubit sequence of a predetermined qubit length (e.g., 40 qubits or the like). The qubits in a qubit sequence are based on attributes associated with a corresponding event. The qubits in the qubit sequence are then entangled with qubits of a primary qubit sequence and maintained within a quantum environment as an entangled list, which also associates the manipulation indicator with the corresponding qubit sequence for a given event within the batch of historical events.

When an event is requested (i.e., a pending event) and is received by a commitment system or the like, attributes associated with the pending event are communicated to the quantum computing platform, which transforms/converts the pending event to the primary qubit sequence in superposition based on the attributes associated with the pending event. In response, the quantum computing platform determines which of the historical events in the entanglement listing is most entangled with the pending event (i.e., which qubit sequence changed the most in response to generating the primary qubit sequence for the pending event). The manipulation indicator associated with the historical event that is most entangled with the pending event is then assigned to the pending event, since this previous event is deemed to be the most similar to the pending event undergoing commitment decisioning. The classical computing platform subsequently makes a determination on whether to approve/commit the pending event to further processing or whether to forbid/decommit the pending event from further processing based on the assigned manipulation indicator.

A system for real-time manipulation prevention of events defines first embodiments of the invention. The system includes a classical computing platform having a first memory, at least one first processor in communication with the first memory, and first instructions stored in the first memory. The first instructions are executable by the at least one first processor and configured to receive first data associated with a plurality of historical events having occurred over a predetermined period of time, and, using Artificial Intelligence (AI) including at least one Machine Learning (ML) classification algorithm, determine, based at least in part on the first data, a manipulation indictor for each of the plurality of historical events.

The system additionally includes a quantum computing platform that is in communication with the classical computer platform. The quantum computing platform includes a quantum memory, at least one quantum processor in communication with the quantum memory and second instructions stored in the quantum memory. The second instructions are executable by the at least one quantum processor. The second instructions are configured to receive the first data and the manipulator indicator for each of the historical events, and, based on at least a portion of the first data, transform each of the plurality of historical events into a qubit sequence having a predetermined number of qubits. The second instructions are further configured to entangle the qubits in the qubit sequence with qubits in a primary qubit sequence and generate/maintain, in a quantum computing environment, an entangled list of the qubit sequences that includes, for each of the historical events, an association between the qubit sequences and the manipulation indicators. The second instructions are further configured to, in response to receiving second data associated with a pending event requiring event commitment decisioning perform, in real-time to receiving the second data, (i) based on at least a portion of the second data, transforming the pending event into the primary qubit sequence, (ii) in response to transforming the pending event into the primary qubit sequence, determining which historical event has a qubit sequence that is most entangled with the primary qubit sequence, and (iii) assigning, to the pending event, as indicated in the entanglement list, the manipulation indicator associated with the historical event having the qubit sequence that is most entangled with the primary qubit sequence.

In addition, according to the system, the first instructions of the classical computing platform are further configured to determine, in real-time to receiving notification of the pending event, an event commitment decision based on the assigned manipulation indicator.

In specific embodiments of the system, the second instructions are further configured to perform, in real-time, determining which historical event has a qubit sequence that is most entangled with the primary qubit sequence by determining which historical event has a qubit sequence that changes most in response to transforming the pending event into the primary qubit sequence.

In other specific embodiments of the system, the second instructions are further configured to perform, in real-time, a predetermined number of iterations of determining which historical event has a qubit sequence that is most entangled with the primary qubit sequence. In related specific embodiments of the system, the second instructions are further configured to perform iteratively, in real-time, determining which historical event has a qubit sequence that is most entangled with the primary qubit sequence until achieving a predetermined level of confidence that the qubit sequence is the most entangled.

In yet further specific embodiments of the system, the first instructions are further configured to determine the manipulation indictor for each of the plurality of historical events based further on historical event data and one or more lists that indicate entities that have manipulated previous events.

In additional further specific embodiments of the system, the first instructions are further configured to determine, in real-time to receiving notification of the pending event, the event commitment decision based on comparing the assigned manipulation indicator to a predetermined manipulation indicator threshold.

In yet further specific embodiments of the system, the event is a financial transaction and the first data and second data include parties to the transaction, a transaction type, a transaction amount and a transaction time. In such embodiments of the system, the financial transaction may comprise an exchange traded stock transaction or an over-the-counter stock transaction. In related embodiments of the system, the second instructions are further configured to, based on the parties to the transaction, the transaction type, the transaction amount and the transaction time of each of the historical events, transform each of the plurality of historical events into the qubit sequence having the predetermined number of qubits. In further related embodiments of the system, the second instructions are further configured to perform, in real-time, based on the parties to the transaction, the transaction type, the transaction amount and the transaction time of each of the historical events, transforming the pending event into the primary qubit sequence. In such embodiments of the invention, the first instructions of the classical computing platform are further configured to determine a transaction commitment decision based on the assigned manipulation indicator, wherein the transaction commitment decision provides for (i) allowing the transaction to occur, or (ii) forbidding the transaction from occurring in real-time to receiving notification of the pending transaction.

A computer-implemented method for preventing manipulation of computer-network-based events defines second embodiments of the invention. The method is executed by one or more computer processors. The method includes receiving, by a classical computing processor, first data associated with a plurality of historical events having occurred over a predetermined period of time. In addition, the method includes using Artificial Intelligence (AI) including at least one Machine Learning (ML) classification algorithm to determine, by a classical computing processor, based at least in part on the first data, a manipulation indictor for each of the plurality of historical events.

Further, the method includes receiving, by a quantum computing processor, the first data and the manipulator indicator for each of the historical events and, based on at least a portion of the first data, transforming, by a quantum computer processor, each of the plurality of historical events into a qubit sequence having a predetermined number of qubits. The method further includes entangling, by a quantum computer processor, the qubits in the qubit sequence with qubits in a primary qubit sequence and generating, in a quantum computing environment, an entangled list of the qubit sequences that includes, for each of the historical events, an association between the qubit sequences and the manipulation indicators.

In addition, the method includes, in response to receiving second data associated with a pending event requiring event commitment decisioning, performing, by a quantum computing processor, in real-time (i) based on at least a portion of the second data, transforming the pending event into the primary qubit sequence, (ii) in response to transforming the pending event into the primary qubit sequence, determining which historical event has a qubit sequence that is most entangled with the primary qubit sequence, and (iii) assigning to the pending event, as indicated in the entanglement list, the manipulation indicator associated with the historical event having the qubit sequence that is most entangled with the primary qubit sequence.

Additionally, the method includes determining, by the classical computing processor, in real-time to receiving notification of the pending event, an event commitment decision based on the assigned manipulation indicator.

In specific embodiments of the method, performing, in real-time, determining which historical event has a qubit sequence that is most entangled with the primary qubit sequence further includes determining which historical event has a qubit sequence that changes most in response to transforming the pending event into the primary qubit sequence.

In other specific embodiments of the method, performing, in real-time, determining which historical event has a qubit sequence that is most entangled with the primary qubit sequence further comprises performing a predetermined number of iterations of determining which historical event has the qubit sequence that is most entangled with the primary qubit sequence. In related embodiments of the method, performing, in real-time, determining which historical event has a qubit sequence that is most entangled with the primary qubit sequence further comprises iteratively performing determining which historical event has a qubit sequence that is most entangled with the primary qubit sequence until achieving a predetermined level of confidence that the qubit sequence is the most entangled.

In still further specific embodiments of the method, determining the manipulation indicator for each of the plurality of historical events further comprises determining the manipulation indicator based further on historical event data and one or more lists (e.g., denylists or the like) that indicate entities that have manipulated previous events.

A computer program product including non-transitory computer-readable code defines third embodiments of the invention. The computer-readable medium includes a first set of codes for causing a classical computer processor to receive first data associated with a plurality of historical events having occurred over a predetermined period of time and a second set of codes for causing a classical computer processor to use Artificial Intelligence (AI) including at least one Machine Learning (ML) classification algorithm to determine, based at least in part on the first data, a manipulation indictor for each of the plurality of historical events. The computer-readable medium additionally includes a third set of codes for causing a quantum computer processor to receive the first data and the manipulator indicator for each of the historical events and a fourth set of codes for causing a quantum computer processor to, based on at least a portion of the first data, transform each of the plurality of historical events into a qubit sequence having a predetermined number of qubits. Further, the computer-readable medium includes a fifth set of codes for causing a quantum computer process to entangle the qubits in the qubit sequence with qubits in a primary qubit sequence and a sixth set of codes for causing a quantum computer processor to generate, in a quantum computing environment, an entangled list of the qubit sequences that includes, for each of the historical events, an association between the qubit sequences and the manipulation indicators.

In addition, the computer-readable medium includes a seventh set of codes for causing a quantum computer process to, in response to receiving second data associated with a pending event requiring event commitment decisioning, perform, in real-time, (i) based on at least a portion of the second data, transforming the pending event into the primary qubit sequence, (ii) in response to transforming the pending event into the primary qubit sequence, determining which historical event has a qubit sequence that is most entangled with the primary qubit sequence, and (iii) assigning, to the pending event, as indicated in the entanglement list, the manipulation indicator associated with the historical event having the qubit sequence that is most entangled with the primary qubit sequence.

Moreover, the computer-readable medium includes an eighth set of codes for causing a classical computing processor to determine, in real-time to receiving notification of the pending event, an event commitment decision based on the assigned manipulation indicator.

In specific embodiments of the computer program product, the seventh set of codes is further configured to cause the quantum computer processor to determine which historical event has a qubit sequence that is most entangled with the primary qubit sequence by determining which historical event has a qubit sequence that changes most in response to transforming the pending event into the primary qubit sequence.

In other specific embodiments of the computer program product, the seventh set of codes is further configured to cause the quantum computing process to iteratively perform, in real-time, determining which historical event has a qubit sequence that is most entangled with the primary qubit sequence, wherein the determining occurs one of (i) a predetermined number of iterations, or (ii) iteratively until achieving a predetermined level of confidence that the qubit sequence is the most entangled.

In yet other specific embodiments of the computer program product, the second set of codes is further configured to determine the manipulation indicator based further on historical event data and one or more lists that indicate entities that have manipulated previous events.

Thus, systems, apparatus, methods, and computer program products herein described in detail below provide for real-time prevention of event manipulation through the use of Artificial Intelligence (AI)-assisted quantum computing. As a result of the real-time processing, the present invention is able to determine, at the time when an event is requested, if the event is being manipulated (or likely is being manipulated) and/or is part of a manipulation scheme/pattern and, if so, prevent the event from being initiated.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Thus, embodiments of the invention provide for real-time prevention of event manipulation through the use of Artificial Intelligence (AI)-assisted quantum computing. As a result of the real-time processing, the present invention is able to determine, at the time when an event is requested, if the event is being manipulated (or likely is being manipulated) and/or is part of a manipulation scheme/pattern and, if so, prevent the event from being initiated. Thus, the present invention is especially advantageous in applications where an extremely large volume of events are being processed on an ongoing basis.

As used herein, a quantum computer is any computer that utilizes the principles of quantum physics to perform computational operations. Several variations of quantum computer design are known, including photonic quantum computing, superconducting quantum computing, nuclear magnetic resonance quantum computing, and/or ion-trap quantum computing. Quantum computing involves theoretical computation systems that make direct use of quantum-mechanical phenomena, such as superposition and entanglement, to perform operations on data. Whereas common digital computing, otherwise referred to herein as classical computing, requires that the data be encoded into binary digits (i.e., bits), each of which is always in one of two definite states (0 or 1), quantum computation encode data onto quantum bits, referred to herein as qubits, which can be in superpositions of states. Unlike conventional bits, however, qubits exhibit quantum behavior, allowing the quantum computer to process a vast number of calculations simultaneously. A qubit can be formed by any two-state quantum mechanical system. For example, in some embodiments, a qubit may be the polarization of a single photon or the spin of an electron. Qubits are subject to quantum phenomena that cause them to behave much differently than classical bits. Quantum phenomena include superposition, entanglement, tunneling, superconductivity, and the like.

Two quantum phenomena are especially important to the behavior of qubits in a quantum computer: superposition and entanglement. Superposition refers to the ability of a quantum particle to be in multiple states at the same time. Entanglement refers to the correlation between two quantum particles that forces the particles to behave in the same way even if they are separated by great distances. Together, these two principles allow a quantum computer to process a vast number of calculations simultaneously.

In a quantum computer with n qubits, the quantum computer can be in a superposition of up to 2n states simultaneously. By comparison, a classical computer can only be in one of the 2n states at a single time. As such, a quantum computer can perform vastly more calculations in a given time period than its classical counterpart. For example, a quantum computer with two qubits can store the information of four classical bits. This is because the two qubits will be a superposition of all four possible combinations of two classical bits (00, 01, 10, or 11). Similarly, a three-qubit system can store the information of eight classical bits, four qubits can store the information of sixteen classical bits, and so on. A quantum computer with three hundred qubits could possess the processing power equivalent to the number of atoms in the known universe.

In this regard, quantum computing allows for a more robust computing environment, in which much larger volumes of data can be processed in much shorter periods of time than would otherwise be realized by a classical computer apparatus.

Embodiments of the present invention make use of quantum ability of optimization by utilizing a quantum computer in conjunction with a classical computer. Such a configuration enables the present invention to take advantage of quantum speedup in solving optimization problems, while avoiding the drawbacks and difficulty of implementing quantum computing to perform non-optimization calculations. Specifically, the present invention provides for a classical computing platform to analyze, on a regular basis, a sizeable volume (i.e., a batch) of historical events (e.g., events occurring over the past two years) using AI including one or more Machine Learning (ML) classification algorithms and historical data including denylists, which show relationships to previous manipulative events. The analysis results in a manipulation indicator, otherwise referred to as a manipulation score, for each of the historical events, which indicates a likelihood that the previous event was manipulative or otherwise associated with manipulative events.

In addition, the present invention provides for a quantum computing platform to transform/convert each of the historical events in the batch to a qubit sequence of a predetermined qubit length (e.g., 40 qubits or the like). The qubits in a qubit sequence are based on attributes associated with a corresponding event. The qubits in the qubit sequence are then entangled with qubits of a primary qubit sequence and maintained within a quantum environment as an entangled list, which also associates the manipulation indicator with the corresponding qubit sequence for a given event within the batch of historical events.

When an event is requested (i.e., a pending event) and is received by a commitment system or the like, attributes associated with the pending event are communicated to the quantum computing platform, which transforms/converts the pending event to the primary qubit sequence in superposition based on the attributes associated with the pending event. In response, the quantum computing platform determines which of the historical events in the entanglement listing is most entangled with the pending event (i.e., which qubit sequence changed the most in response to generating the primary qubit sequence for the pending event). The manipulation indicator associated with the historical event that is most entangled with the pending event is then assigned to the pending event, since this previous event is deemed to be the most similar to the pending event undergoing commitment decisioning.

In specific embodiments of the invention, due to the unstable state of the qubits in the quantum environment (referred to the art as "decoherence"), it may be necessary to iteratively determine which of the historical events in the entanglement listing is most entangled with the pending event. In some embodiments of the invention, the number of iterations may be predetermined, while in other embodiments of the invention iterations may continue until a predetermined threshold confidence level is achieved.

The classical computing platform subsequently makes a determination on whether to approve/commit the pending event to further processing or whether to forbid/decommit the pending event from further processing based on the assigned manipulation indicator. In specific embodiments of the invention, such a determination may involve comparing the manipulation indicator to a threshold to determine whether the pending event should be approved/committed for processing or forbidden/de-committed from further processing.

Figure 1:
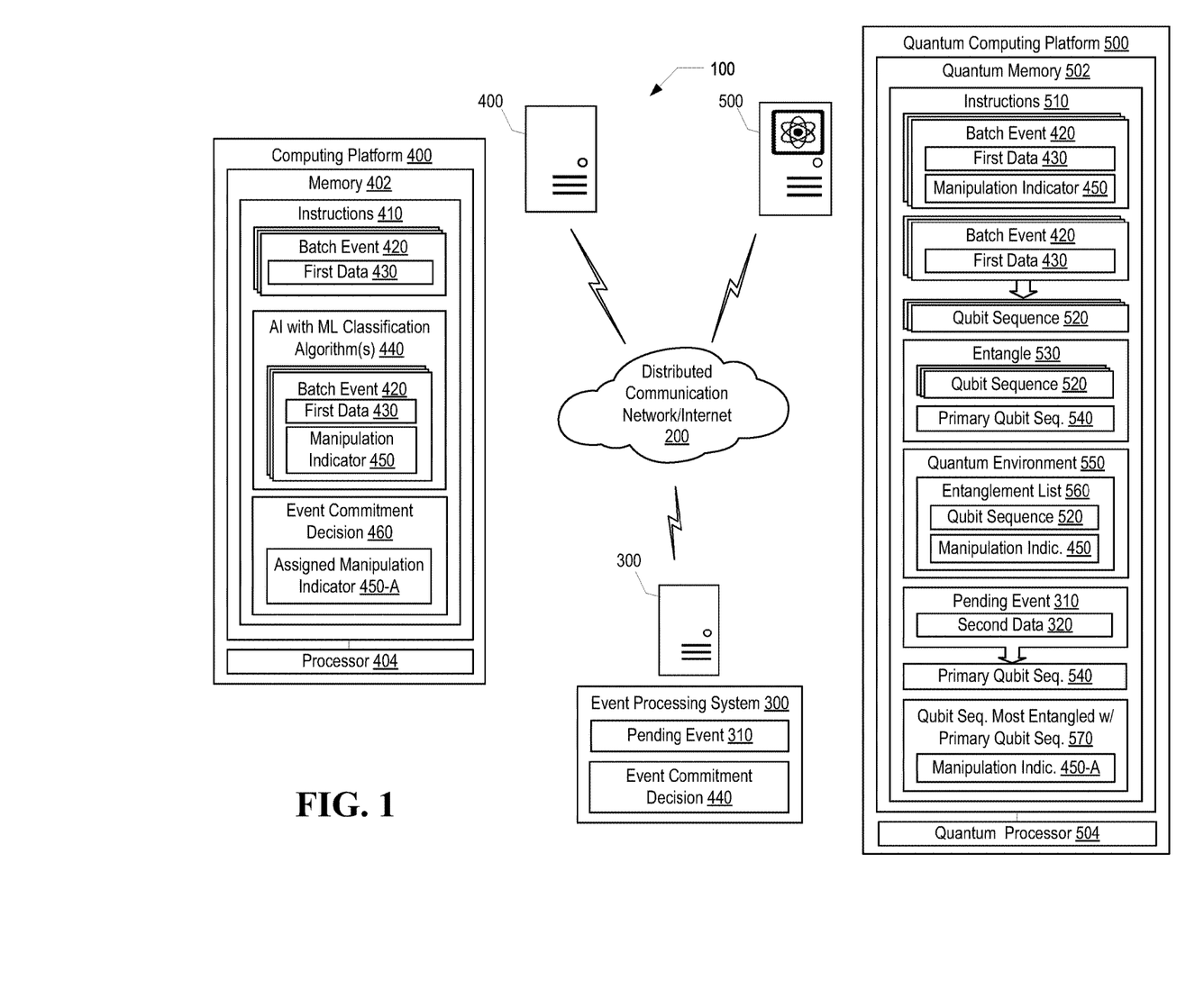
FIG. 1 is a schematic diagram of a system for preventing manipulation of computerized events through Artificial Intelligence (AI)-assisted quantum computing, in accordance with embodiments of the present invention.

FIG. 1 is a schematic diagram of a system 100 configured for preventing manipulation of computer-processed events using Artificial Intelligence (AI)-assisted quantum computing, in accordance with embodiments of the present invention. The system is implemented in a distributed communication network 200, such as the Internet and/or one or more intranets and the like. The system includes an event processing system 300 that is configured to initiate processing of a pending event 310 in response to an event commitment decision 440. In accordance with embodiments of the present invention, the event processing system 300 is enabled to receive the event commitment decision is real-time to receiving the request to process the pending event 310.

The system 100 additionally includes a computing platform 400, which is otherwise referred to herein as a classical or conventional binary computing platform. The computing platform 400 includes a memory 402 and at least one processor device 404 in communication with the memory 402. The memory 402 stores instructions 410 that are executable by the one or more processing devices 404. The instructions 410 are configured to receive first data 430 associated with a plurality of batch events 420, which have occurred over a predetermined period of time. For example, the batch events 420 may include all of the events encountered by event processing system and/or other related systems over the previous year, two years or the like. In those embodiments of the invention in which the event is a financial transaction, the first data may include, but is not limited to transaction type, transaction parties (e.g., payees and payors), transaction amount and transaction time (e.g., data and/or time).

Instructions 410 are further configured to implement AI including at least one ML classification algorithm to determine a manipulation indicator 450 for each of the events in the batch events 420. The manipulation indicator 450 indicates the likelihood that the event is manipulated event and/or the degree to which the event is associated with a manipulated event. In specific embodiments of the system, the manipulation indicator 450 is a manipulation score in which the higher the score, the higher the likelihood that the event is manipulated event and/or the degree to which the event is associated with a manipulated event. The manipulation indicator 450 is determined based on the first data 430 and, in some embodiments of the system, historical event data that details previous manipulated events and/or denylist(s) that detail previous parties or, in some instances, closely-related parties to manipulated events.

System 100 additionally includes quantum computing platform 500. The quantum computing platform 500 includes a quantum memory 502 and at least one quantum processor device 504 in communication with the quantum memory 502. The quantum memory 502 stores instructions 510 that are executable by the one or more quantum processing devices 504. The instructions 510 are configured to receive the first data 430 and the manipulation indicator 450 for each event in the batch events 420 and transform/convert each of the batch events 420 into a qubit sequence 520 having predetermined qubit length. For example, the qubit length may be 40, which provides for one trillion different sequence states. The batch events 420 are transformed/converted to the qubit sequence 520 based on the first data 430. Once the qubit sequences have been rendered, the instructions 510 are configured to entangle 530 the qubit sequences 520 or, more specifically the qubit sequence states associated with the qubit sequence with a primary qubit sequence and maintain an entanglement list 560, in a quantum computing environment 550, which associates the qubit sequence 520 with a corresponding manipulation indicator 450 for each of the events in the batch events 420.

Once the entanglement list 510 has been generated and maintained in the quantum computing environment 550 and in response to receiving second data 320 associated with a pending event 310 requiring event commitment decisioning, instructions 510 are configured transform/convert the pending event 310 to the primary qubit sequence 540 based on the second data 320. Since the primary qubit sequence 540 is entangled with the qubit sequences 520, transformation of the pending event to the primary qubit sequence 540 will result in alteration of qubits in the qubit sequences 520 (i.e., some of the qubits in some of the qubit sequences will change to alter the state of the qubit sequence undergoing the change).

As a result of the states change in the quantum sequences 520, instructions 510 is configured to determine which batch event from amongst the batch events 540 is the most entangled with the pending event 310. Determining which batch event is most entangled with the pending event 310 occurs by determining the qubit sequence 570 most entangled (i.e., experiencing the most change) with the primary qubit sequence 540.

In response to determining the qubit sequence 570 most entangled with the primary qubit sequence 540, the instructions 510 are configured to assign, to the pending event 310, the manipulation indicator 450-A associated with the qubit sequence 570 most entangled with the primary qubit sequence 540 (as indicated in the entanglement listing 560).

In response, to assigning the manipulation indicator 450-A, instructions 410 of computing platform 400 are configured to receive the manipulation indicator 450-A and determine, in real-time to receiving the input requesting the processing of the pending event 310, an event commitment decision 460 based on the assigned manipulation indicator 450-A. The event commitment decision 460 may be to approve/commit the event for processing, decline/decommit the event from processing and/or require the event initiator to provide further authentication credentials.

Figure 2:
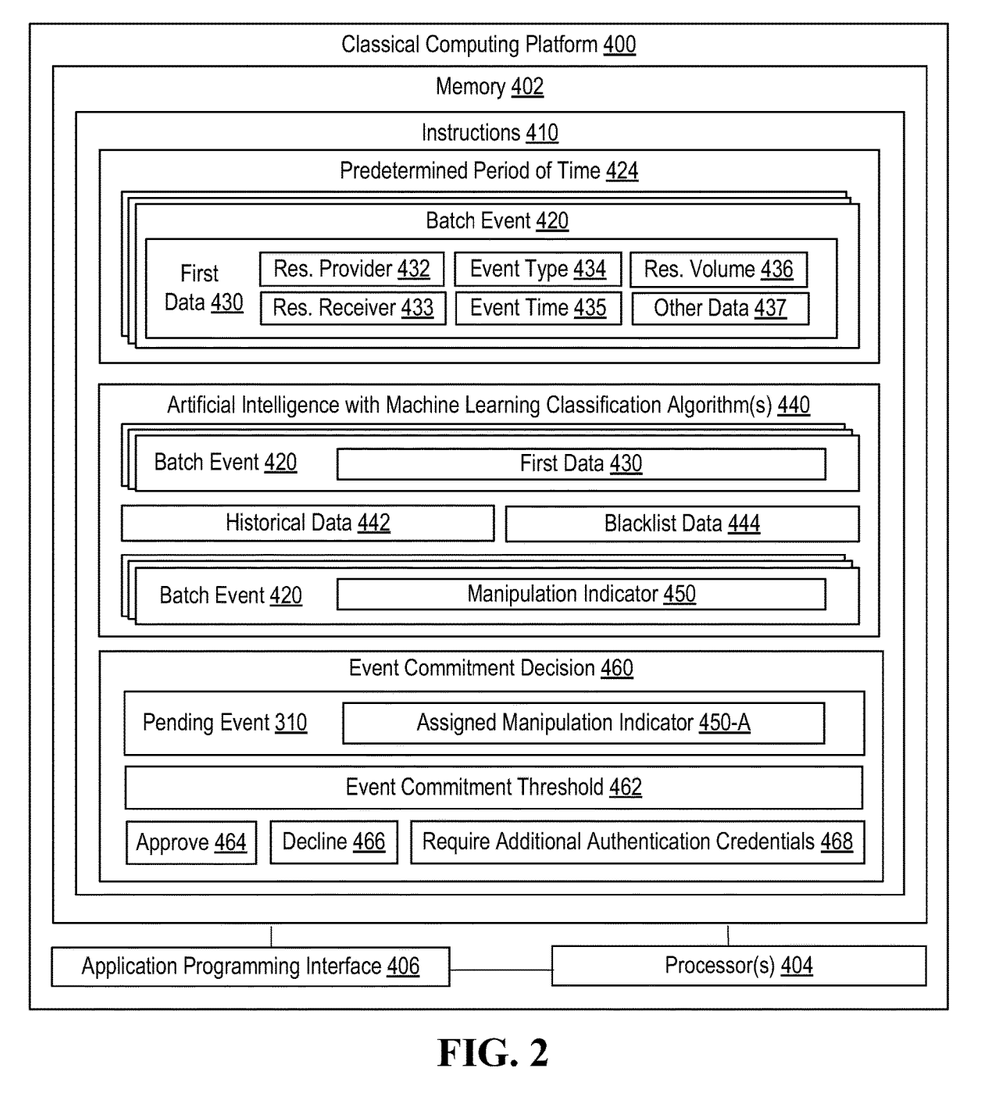
FIG. 2 is a block diagram of a classical computing platform used for determining manipulation indicators for batch events and determining event commitment decisions for pending events, in accordance with embodiments of the present invention.

Referring to FIG. 2 a block diagram is depicted of a classical computing platform 400 for determining manipulation indicators and performing event commitment decisioning, in accordance with embodiments of the present invention. In addition to providing greater detail, FIG. 2 highlights various alternative embodiments of the invention. The classical computing platform 400 may comprise one or typically more computing devices (e.g., servers or the like) and is configured to execute engines, including algorithms, modules, routines, applications and the like. Classical computing platform 400 includes memory 402 and the like which may comprise volatile and non-volatile memory, such as read-only and/or random-access memory (RAM and ROM), EPROM, EEPROM, flash cards, or any memory common to computing platforms). Moreover, memory 402 and the like may comprise cloud storage, such as provided by a cloud storage service and/or a cloud connection service.

Further, classical computing platform 400 also includes at least one processor device 404, or the like which may be an application-specific integrated circuit ("ASIC"), or other chipset, logic circuit, or other data processing device configured to implement artificial intelligence including machine learning techniques. Processing device(s) 404 or the like may execute one or more application programming interface (APIs) 406 that interface with any resident programs, such as instructions 410 or the like stored in the memory 402 of the classical computing platform 400 and any external programs. Processing device(s) 404 may include various processing subsystems (not shown in FIG. 2) embodied in hardware, firmware, software, and combinations thereof, that enable the functionality of the classical computing platform 400 and the operability of the classical computing platform 400 on the distributed communications network 200 (shown in FIG. 1). For example, processing subsystems allow for initiating and maintaining communications and exchanging data with other networked devices, such as event processing system 300 and quantum computing platform 500 (shown in FIG. 1). For the disclosed aspects, processing subsystems of classical computing platform 400 may include any processing subsystem used in conjunction with instructions 410 and related engines, tools, routines, sub-routines, algorithms, sub-algorithms, sub-modules thereof.

Classical computing platform 400 may additionally include a communications module (not shown in FIG. 2) embodied in hardware, firmware, software, and combinations thereof, that enables electronic communications between the classical computing platform 400 and other network devices, such as, but not limited to, event processing system 300 and quantum computing platform 500 (shown in FIG. 1). Thus, communication module may include the requisite hardware, firmware, software and/or combinations thereof for establishing and maintaining a network communication connection with one or more network devices.

Memory 502 of computing platform 500 stores instructions 510 that receive first data 430 associated with a plurality of batch events 420, which have occurred over a predetermined period of time. For example, the batch events 420 may include all of the events encountered by event processing system and/or other related systems over the previous year, two years or the like. The first data may include, but is not limited to resource provider 432, resource receiver 433, event type 434, resource time 435 (e.g., data and/or time), resource volume 436 and any other data 437 associated with the event that is deemed relevant to manipulation.

Instructions 410 are further configured to implement AI including at least one ML classification algorithm to determine a manipulation indicator 450 for each of the events in the batch events 420. The manipulation indicator 450 indicated the likelihood that the event is manipulated event and/or the degree to which the event is associated with a manipulated event. In specific embodiments of the system, the manipulation indicator 450 is a manipulation score in which the higher the score, the higher the likelihood that the event is manipulated event and/or the degree to which the event is associated with a manipulated event. The manipulation indicator 450 is determined based on the first data 430 and, in some embodiments of the system, historical event data 442 that details previous manipulated events and/or denylist(s) 444 that detail previous parties or, in some instances, closely-related parties to manipulated events.

Once the quantum computing platform 500 has identified the manipulation indicator 450-A to assign to a pending event 310 instructions 410 of computing platform 400 are configured to receive the manipulation indicator 450-A and determine, in real-time to receiving the input requesting the processing of the pending event 310, an event commitment decision 460 for the pending event 310 based on the assigned manipulation indicator 450-A. The event commitment decision 460 may include approve/commit 464, decline/decommit 466 and, in some embodiments, request additional authentication credentials 468 from the event inputter/initiator. In specific embodiments of the invention, the event commitment decision 460 may be based on an event commitment threshold(s) 462, which indicates an acceptable/unacceptable level of suspicion associated with the pending event 310. For example, if the manipulation indicator indicates an 80% likelihood that the pending event is a manipulated event and/or associated with manipulated events and the event commitment threshold is 50%, then the pending event is declined. In specific embodiments of the invention one threshold may be set for approve/decline and another may be set for additional authentication credentials/decline. For example, the event commitment threshold may be manipulation indicator 450 of 50% and the threshold for requiring additional authentication credentials 468 may be a manipulation indicator of 40%.

Figure 3:
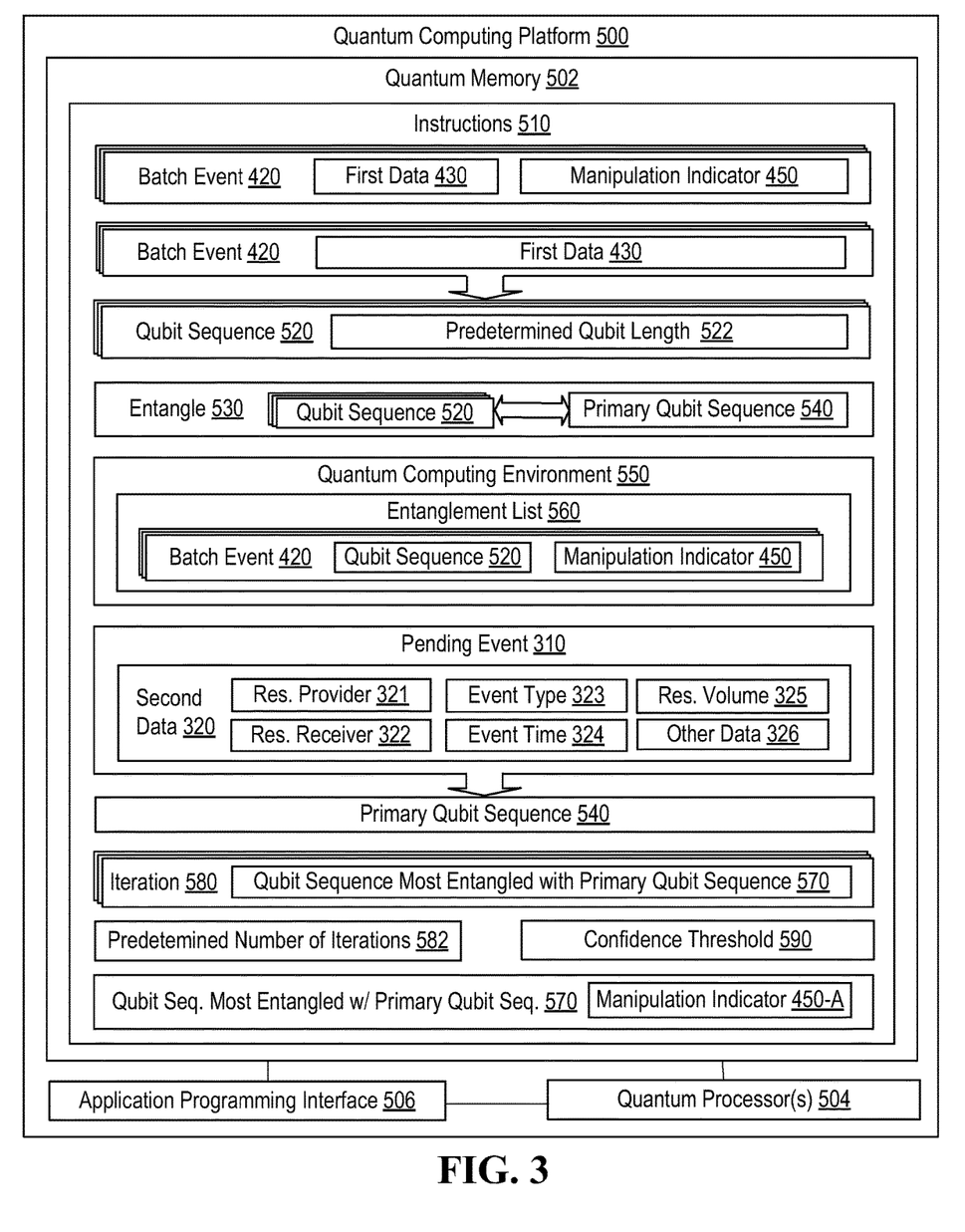
FIG. 3 is a block diagram of a quantum computing platform used for converting batch events to qubit sequences, entangling the qubit sequences with primary qubits, maintain an entanglement listing in an quantum environment, converting a pending event to the primary qubit sequence and determining which qubit sequence is most entangled with the primary qubit sequence, in accordance with embodiments of the present invention.

Referring to FIG. 3 a block diagram is depicted of a quantum computing platform 500 for converting batch events to qubit sequences, entangling the qubit sequences with primary qubits, maintain an entanglement listing in an quantum environment, converting a pending event to the primary qubit sequence and determining which qubit sequence is most entangled with the primary qubit sequence, in accordance with embodiments of the present invention. In addition to providing greater detail, FIG. 3 highlights various alternative embodiments of the invention. The quantum computing platform 500 may comprise one or typically more quantum computing devices and non-quantum computing devices and is configured to execute engines, including algorithms, modules, routines, applications and the like. Quantum computing platform 500 includes memory 502 that is configured to store a quantum state that holds qubits.

Further, quantum computing platform 500 also includes at least one quantum processor device 504, or the like configured to implement instructions. Quantum processing device(s) 504 or the like may execute one or more application programming interface (APIs) 506 that interface with any resident programs, such as instructions 510 or the like stored in the quantum memory 502 of the quantum computing platform 500 and any external programs. Quantum processing device(s) 504 may include various processing subsystems (not shown in FIG. 3) embodied in hardware, firmware, software, and combinations thereof, that enable the functionality of the quantum computing platform 500 and the operability of the quantum computing platform 500 on the distributed communications network 200 (shown in FIG. 1). For example, processing subsystems allow for initiating and maintaining communications and exchanging data with other networked devices, such as event processing system 300 and computing platform 300 (shown in FIG. 1). For the disclosed aspects, processing subsystems of quantum computing platform 500 may include any processing subsystem used in conjunction with instructions 510 and related engines, tools, routines, sub-routines, algorithms, sub-algorithms, sub-modules thereof.

Quantum computing platform 500 may additionally include a communications module (not shown in FIG. 3) embodied in hardware, firmware, software, and combinations thereof, that enables electronic communications between the classical computing platform 400 and other network devices, such as, but not limited to, event processing system 300 and quantum computing platform 500 (shown in FIG. 1). Thus, communication module may include the requisite hardware, firmware, software and/or combinations thereof for establishing and maintaining a network communication connection with one or more network devices.

The memory 502 stores instructions 510 that are configured to receive the first data 430 and the manipulation indicator 450 for each event in the batch events 420 and transform/convert each of the batch events 420 into a qubit sequence 520 having predetermined qubit length 522. The batch events 420 are transformed/converted to the qubit sequence 520 based on the first data 430. For example, in those embodiments of the invention in which the event is a financial transaction, such as bank transaction, an exchange traded stock or an over the counter stock trade, the first data 430 that is used to convert the event to the qubit sequence 520 may include, but is not limited to, the parties to the transaction, the type of transaction, the amount of the transaction and the date/time of the transaction.

Once the qubit sequences 520 have been rendered, the instructions 510 are configured to entangle 530 the qubit sequences 520 or, more specifically the qubit sequence states associated with the qubit sequence with a primary qubit sequence and maintain an entanglement list 560, in a quantum computing environment 550, which associates the qubit sequence 520 with a corresponding manipulation indicator 450 for each of the events in the batch events 420.

Once the entanglement list 510 has been generated and maintained in the quantum computing environment 550 and in response to receiving second data 320 associated with a pending event 310 requiring event commitment decisioning, instructions 510 are configured transform/convert the pending event 310 to the primary qubit sequence 540 based on the second data 320. The second data 320 used to transform the pending event 310 to the primary qubit sequence 540 may include, but is not limited, a resource provider 321, a resource receiver 322, an event type 323, and event time 324, a resource volume 326 and any other data 326 associated with the pending event 326 that is relevant to determining the manipulation likelihood of the event. Since the primary qubit sequence 540 is entangled with the qubit sequences 520, transformation of the pending event to the primary qubit sequence 540 will result in alteration of qubits in the qubit sequences 520 (i.e., some of the qubits in some of the qubit sequences will change to alter the state of the qubit sequence undergoing the change).

As a result of the states change in the quantum sequences 520, instructions 510 is configured to determine which batch event from amongst the batch events 540 is the most entangled with the pending event 310. Determining which batch event is most entangled with the pending event 310 occurs by determining the qubit sequence 570 most entangled (i.e., the qubit sequence experiencing the most change) with the primary qubit sequence 540. Due to possible instability in the quantum computing environment 550 (e.g., heat fluctuations and the like), in some embodiments of the invention it may be necessary to perform a plurality of iterations 580 of determining which batch event from amongst the batch events 540 is the most entangled with the pending event 310. In specific embodiments of the invention, a predetermined number of iterations 582 are executed, while in other embodiments of the invention, iterations continue until a predetermined confidence level/threshold 590 is achieved.

In response to determining the qubit sequence 570 most entangled with the primary qubit sequence 540, the instructions 510 are configured to assign, to the pending event 310, the manipulation indicator 450-A associated with the qubit sequence 570 most entangled with the primary qubit sequence 540 (as indicated in the entanglement listing 560).

Figure 4:
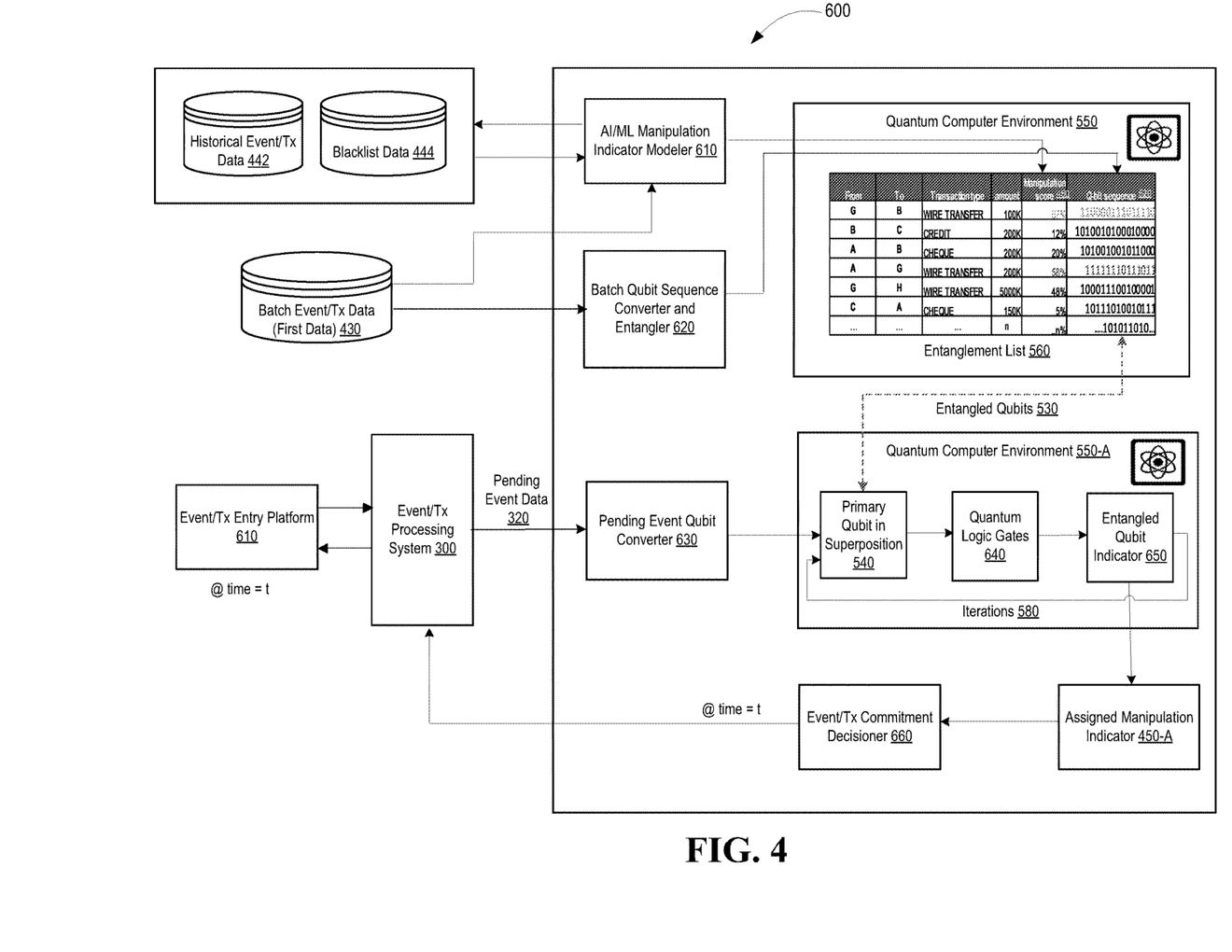
FIG. 4 is a schematic/flow diagram of a system/method for preventing manipulation of computerized events through Artificial Intelligence (AI)-assisted quantum computing, in accordance with an aspect of the present invention.

Referring to FIG. 4 a schematic/flow diagram is provided of a system/method 600 for preventing manipulation of computerized events, such as transactions, using AI-assisted quantum computing, in accordance with embodiments of the present invention. Batch event/transaction data, otherwise referred to herein as first data 430 is received by AI/ML manipulation indicator modeler 610, which includes one or more ML classification algorithms. The event/transaction data 430 may include data associated with all of the events/transactions encountered with a predetermined time period, such previous year, two years or the like and the specific data may include, but is not limited to, resource provider (e.g., payor), resource recipient (e.g., payee), event/transaction type, resource amount and event/transaction time. The data 430 may be received and processed by the AI/ML manipulation indicator modeler 610 on a regular, ongoing basis, such as daily or the like. The modeler 610 uses the batch event/transaction data 430 along with historical event/transaction data 442 and denylist data 444 to determine a manipulation indicator 450, which may be a score that indicates the likelihood of the event/transaction being manipulated or otherwise associated with other manipulated events/transactions.

Additionally, the same batch event/transaction data 430 is received by the quantum sequence converter and entangler 620, which is configured to convert, based on the data 430, each event/transaction in the batch to a qubit sequence 520 of a predetermined length (e.g., 40 bit sequence having one trillion states). In accordance with specific embodiments of the invention, the qubit sequences 520 are then classified based on the corresponding manipulation indicator 450 and manipulation indicator thresholds. Additionally, quantum sequence converter and entangler 620 is configured to entangle 530 the qubits in the qubit sequences with qubits of a primary qubit sequence. The resulting qubit sequences and stored in an entanglement listing 560 maintained in a quantum computing environment 550. As shown the listing 560 may also include corresponding data 430 and manipulation indicator 450.

Once the entanglement listing 560 is maintained in the quantum computing environment, at a subsequent point in time (t) an event/transaction entry platform 610, such as a front-end user-interface or the like receives a user input of the event/transaction and communicates the input to a event/transaction processing system 310, which serves as the event/transaction commitment system for accepting or denying the further processing of the event/transaction. The event/transaction processing system 310 communicates pending event data 320, such as, but not limited to, resource provider (e.g., payor), resource recipient (e.g., payee), event/transaction type, resource amount and event/transaction time to the pending event qubit converter 630.

The pending event qubit converter converts the pending event to the primary qubit sequence in a superposition which is maintained in a quantum computing environment 550-A. The quantum computing environment 550 may be the same or a different quantum computing environment as quantum computing environment 550. For example, the entanglement listing 560 may be maintained in a quantum computing environment 550 located in a first country, while the primary qubit sequence may be maintained in a different quantum computing environment 550-A located in a second country. The primary qubit sequence is passed to the quantum logic gates 640 where a determination is made as to which of the qubit sequences in the entanglement listing are most entangled with the primary qubit sequence (i.e., which qubit sequence experienced the most change upon conversion/transformation of the pending event to the primary qubit sequence). Once the most entangled qubit sequence is determined the corresponding manipulation indicator is deemed to be the entangled qubit indicator 650. As previously discussed, since the quantum computing environment may be unstable (e.g., variance in heat or the like), multiple iterations of determining the most entangled qubit sequence and corresponding manipulation indicator (i.e., entangled qubit indicator 650) may be performed to obtain a requisite confidence that the qubit sequence is the most entangled qubit sequence.

Once the requisite number of iterations have been run and the most entangled qubit sequence has been determined to the requisite level of confidence, the corresponding manipulation indicator is assigned to the pending event (i.e., the manipulation indicator of the event in the events that has been determined to be most similar to the pending event is assigned to the pending event). The classical computing platform subsequently implements event/transaction commitment decisioner 660 to determine whether to accept/commit or decline/decommit the event/transaction for further processing based on the assigned manipulation indicator 450-1. As previous discussed, decisioner 660 may compare the assigned manipulation indicator 450-1 to one or more thresholds to determine whether to accept, decline or, in some embodiments, require the user to input further authentication credentials.

Figure 5:
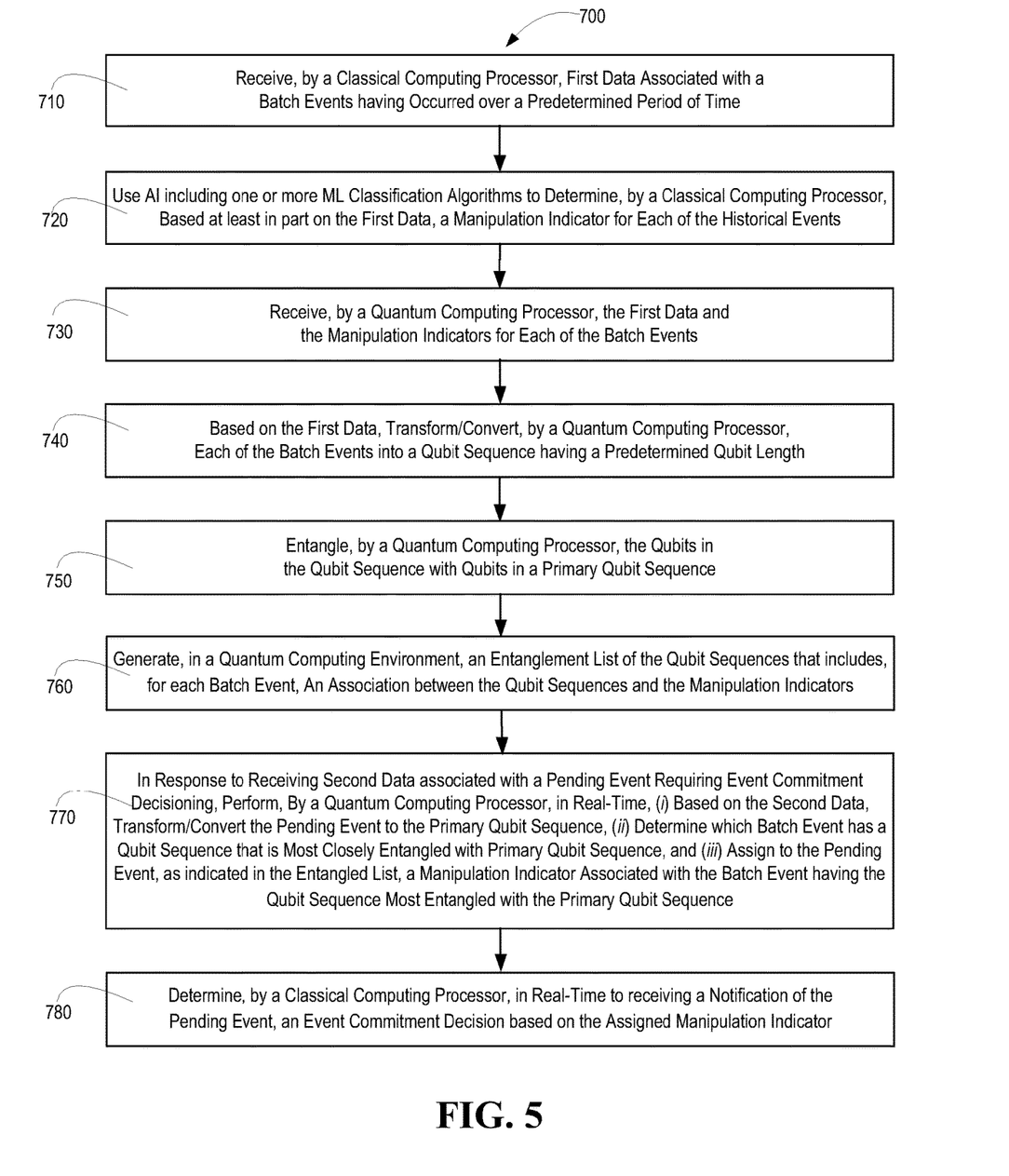
FIG. 5 is a flow diagram of a method for preventing manipulation of computerized events through Artificial Intelligence (AI)-assisted quantum computing, in accordance with an aspect of the present invention.

Referring to FIG. 5 a flow diagram is presented of a method 700 for preventing manipulation of computerized events through Artificial Intelligence (AI)-assisted quantum computing, in accordance with embodiments of the present invention.

At Event 710 first data is received by a classical computing platform. The first data is associated with a plurality of batch events, which have occurred over a predetermined period of time. For example, the batch events may include all of the events encountered by event processing system and/or other related systems over the previous year, two years or the like. In those embodiments of the invention in which the event is a financial transaction, the first data may include, but is not limited to transaction type, transaction parties (e.g., payees and payors), transaction amount and transaction time (e.g., data and/or time) and the like.

At Event 720, AI including at least one Machine Learning (ML) classification algorithm are used to determine a manipulation indicator for each of the events in the batch events. The manipulation indicator indicates the likelihood that the event is manipulated event and/or the degree to which the event is associated with a manipulated event. In specific embodiments of the system, the manipulation indicator is a manipulation score in which the higher the score, the higher the likelihood that the event is manipulated event and/or the degree to which the event is associated with a manipulated event. The manipulation indicator is determined based at least on the first data and, in some embodiments of the system, historical event data that details previous manipulated events and/or denylist(s) that detail previous parties or, in some instances, closely-related parties to manipulated events.

At Event 730, the first data and the manipulation indicator for each event in the batch events are received by a quantum computing platform. At Event 740, the batch events are transformed/converted into a qubit sequence having predetermined qubit length. For example, the qubit length may be 40, which provides for one trillion different sequence states. The batch events are transformed/converted to the qubit sequence based on the first data.

In response to rendering the qubit sequences, at Event 750, the qubit sequences or, more specifically the qubit sequence states associated with the qubit sequence are entangled with a primary qubit sequence and, at Event 760 an entanglement list is generated and maintained in a quantum computing environment. The entanglement listing associates the qubit sequence with a corresponding manipulation indicator for each of the events in the batch events.

In response to generating and maintaining the entanglement list and in response to the quantum computing platform receiving second data associated with a pending event requiring event commitment decisioning, at Event 770, the quantum computer performs, in real-time, (i) transforming/converting the pending event to the primary qubit sequence based on the second data, (ii) determining which batch event from amongst the batch events is the most entangled with the pending event, and (iii) assigning, to the pending event, the manipulation indicator associated with the qubit sequence most entangled with the primary qubit sequence. Since the primary qubit sequence is entangled with the qubit sequences, transformation of the pending event to the primary qubit sequence will result in alteration of qubits in the qubit sequences (i.e., a state change). Determining which batch event is most entangled with the pending event occurs by determining the qubit sequence 570 most changed/altered from the primary qubit sequence. As previously discussed, due to the variance in the states in the quantum environment, it may be necessary, in specific embodiments of the invention, to perform numerous iterations of determining which batch event from amongst the batch events is the most entangled with the pending event. In such embodiments of the invention, the number of iterations may be predetermined or, in other embodiments of the invention, the iterations may continue until a predetermined confidence level is achieved (i.e., the confidence level indicating the likelihood that the qubit sequence is the most entangled).

At Event 780, the classical computing platform is configured to determine, in real-time to receiving an event request input for the pending event, an event commitment decision based on the assigned manipulation indicator. The event commitment decision includes accepting the pending event for further processing, declining the pending event for further processing and, in specific embodiments, requiring the event inputter/initiator to provide additional authentication credentials. In specific embodiments of the invention, the event commitment decision is determined by comparing the manipulation indicator to an event commitment threshold or the like.

As evident from the preceding description, the systems, methods and the like described herein represents an improvement in technology, Specifically, by implementing a quantum computing to determine, in real-time to requesting the event, which previous event is most similar to a pending event and subsequently decisioning the commitment/decommitment of the event based on manipulation indicator associated with the most similar previous event, the present invention frees up network resources that would otherwise be used if an event found to be manipulative was allowed to be committed (i.e., allowed to proceed with network processing). In addition, since the decisioning occurs in real-time to the requesting of the event, no post-processing network resources are needed to determine if the event is manipulative and, if so, no network resources are need to cancel or undo an event in progress or previously completed.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for real-time prevention of event manipulation, comprising:
   a classical computing platform comprising a first memory, at least one first processor in communication with the first memory, and first instructions stored in the first memory, wherein the first instructions are executable by the at least one first processor and configured to:
      receive (i) first data associated with a plurality of historical events having occurred over a predetermined period of time and (ii) one or more denylists that list parties to previous manipulative events, and
      using Artificial Intelligence (AI) including at least one Machine Learning (ML) classification algorithm to determine, based at least in part on the first data and the one or more denylists, a manipulation indicator for each of the plurality of historical events, wherein the manipulation indicator provides an indication of a likelihood that the respective historical event was manipulative or is associated with manipulative events; and
   a quantum computing platform in communication with the classical computer platform and comprising a quantum memory, at least one quantum processor in communication with the quantum memory and second instructions stored in the quantum memory, wherein the second instructions are executable by the at least one quantum processor and configured to:
      receive the first data and the manipulator indicator for each of the historical events,
      based on at least a portion of the first data, transform each of the plurality of historical events into a qubit sequence having a predetermined number of qubits,
      entangle the qubits in the qubit sequence with qubits in a primary qubit sequence, generate, in a quantum computing environment, an entangled list of the qubit sequences that includes, for each of the historical events, an association between the qubit sequences and a corresponding one of the manipulation indicators, and in response to receiving second data associated with a pending event requiring event commitment decisioning, perform, in real-time:

based on at least a portion of the second data, transforming the pending event into the primary qubit sequence, in response to transforming the pending event into the primary qubit sequence, performing, iteratively, determinations of which historical event has a qubit sequence that is most entangled with the primary qubit sequence, wherein the determinations occur iteratively until a predetermined level of confidence is achieved that the qubit sequence is one that is most entangled with the primary qubit sequence, and assigning, to the pending event, as indicated in the entanglement list, the manipulation indicator associated with the historical event having the qubit sequence that is most entangled with the primary qubit sequence, wherein the first instructions of the classical computing platform are further configured to determine, in real-time to receiving notification of the pending event, an event commitment decision based on the assigned manipulation indicator.

2. The system of claim 1, wherein the second instructions are further configured to perform, in real-time, determining which historical event has a qubit sequence that is most entangled with the primary qubit sequence by determining which historical event has a qubit sequence that changes most in response to transforming the pending event into the primary qubit sequence.

3. The system of claim 1, wherein the first instructions are further configured to determine, in real-time to receiving notification of the pending event, the event commitment decision based on comparing the assigned manipulation indicator to a predetermined manipulation indicator threshold.

4. The system of claim 1, wherein the event is a financial transaction and the first data and second data include parties to the transaction, a transaction type, a transaction amount and a transaction time.

5. The system of claim 4, wherein the financial transaction comprises an exchange traded stock transaction or an over-the-counter stock transaction.

6. The system of claim 4, wherein the second instructions are further configured to:

based on the parties to the transaction, the transaction type, the transaction amount and the transaction time of each of the historical events, transform each of the plurality of historical events into the qubit sequence having the predetermined number of qubits.

7. The system of claim 4, wherein the second instructions are further configured to:

perform, in real-time, based on the parties to the transaction, the transaction type, the transaction amount and the transaction time of each of the historical events, transforming the pending event into the primary qubit sequence.

8. The system of claim 4, wherein the first instructions of the classical computing platform are further configured to determine a transaction commitment decision based on the assigned manipulation indicator, wherein the transaction commitment decision provides for (i) allowing the transaction to occur, or (ii) forbidding the transaction from occurring in real-time to receiving notification of the pending transaction.

9. A computer-implemented method for real-time prevention of event manipulation, the method executed by one or more computer processors and comprising:

receiving, by a classical computing processor, (i) first data associated with a plurality of historical events having occurred over a predetermined period of time and (ii) one or more denylists that list parties to previous manipulative events;

using Artificial Intelligence (AI) including at least one Machine Learning (ML) classification algorithm to determine, by a classical computing processor, based at least in part on the first data and the one or more denylists, a manipulation indicator for each of the plurality of historical events, wherein the manipulation indicator provides an indication of a likelihood that the respective historical event was manipulative or is associated with manipulative events;

receiving, by a quantum computing processor, the first data and the manipulator indicator for each of the historical events;

based on at least a portion of the first data, transforming, by a quantum computer processor, each of the plurality of historical events into a qubit sequence having a predetermined number of qubits;

entangling, by a quantum computer processor, the qubits in the qubit sequence with qubits in a primary qubit sequence;

generating, in a quantum computing environment, an entangled list of the qubit sequences that includes, for each of the historical events, an association between the qubit sequences and the manipulation indicators;

in response to receiving second data associated with a pending event requiring event commitment decisioning, performing, by a quantum computing processor, in real-time:

based on at least a portion of the second data, transforming the pending event into the primary qubit sequence, in response to transforming the pending event into the primary qubit sequence, performing, iteratively, determinations of which historical event has a qubit sequence that is most entangled with the primary qubit sequence, wherein the determinations occur iteratively until a predetermined level of confidence is achieved that the qubit sequence is one that is most entangled with the primary qubit sequence, and assigning, to the pending event, as indicated in the entanglement list, the manipulation indicator associated with the historical event having the qubit sequence that is most entangled with the primary qubit sequence; and determining, by the classical computing processor, in real-time to receiving notification of the pending event, an event commitment decision based on the assigned manipulation indicator.

10. The computer-implemented method of claim 9, wherein performing, in real-time, determining which historical event has a qubit sequence that is most entangled with the primary qubit sequence further comprises determining which historical event has a qubit sequence that changes most in response to transforming the pending event into the primary qubit sequence.

11. A computer program product comprising non-transitory computer-readable code including:
- a first set of codes for causing a classical computer processor to receive (i) first data associated with a plurality of historical events having occurred over a predetermined period of time and (ii) one or more denylists that list parties to previous manipulative events;
- a second set of codes for causing a classical computer processor to use Artificial Intelligence (AI) including at least one Machine Learning (ML) classification algorithm to determine, based at least in part on the first data and the one or more denylists, a manipulation indicator for each of the plurality of historical events;
- a third set of codes for causing a quantum computer processor to receive the first data and the manipulator indicator for each of the historical events, wherein the manipulation indicator provides an indication of a likelihood that the respective historical event was manipulative or is associated with manipulative events;
- a fourth set of codes for causing a quantum computer processor to, based on at least a portion of the first data, transform each of the plurality of historical events into a qubit sequence having a predetermined number of qubits;
- a fifth set of codes for causing a quantum computer process to entangle the qubits in the qubit sequence with qubits in a primary qubit sequence;
- a sixth set of codes for causing a quantum computer processor to generate, in a quantum computing environment, an entangled list of the qubit sequences that includes, for each of the historical events, an association between the qubit sequences and the manipulation indicators;
- a seventh set of codes for causing a quantum computer process to, in response to receiving second data associated with a pending event requiring event commitment decisioning, perform, in real-time:
  - based on at least a portion of the second data, transforming the pending event into the primary qubit sequence,
  - in response to transforming the pending event into the primary qubit sequence, performing, iteratively, determinations of which historical event has a qubit sequence that is most entangled with the primary qubit sequence, wherein the determinations occur iteratively until a predetermined level of confidence is achieved that the qubit sequence is one that is most entangled with the primary qubit sequence, and
  - assigning to the pending event, as indicated in the entanglement list, the manipulation indicator associated with the historical event having the qubit sequence that is most entangled with the primary qubit sequence; and
- an eighth set of codes for causing a classical computing processor to determine, in real-time to receiving notification of the pending event, an event commitment decision based on the assigned manipulation indicator.

12. The computer program product of claim 11, wherein the seventh set of codes is further configured to cause the quantum computer processor to determine which historical event has a qubit sequence that is most entangled with the primary qubit sequence by determining which historical event has a qubit sequence that changes most in response to transforming the pending event into the primary qubit sequence.

* * * * *